United States Patent
Shinozaki et al.

(10) Patent No.: US 6,947,636 B2
(45) Date of Patent: Sep. 20, 2005

(54) OPTICAL MODULE

(75) Inventors: Atsushi Shinozaki, Tokyo (JP);
Takashi Shigematsu, Tokyo (JP);
Toshihiko Ota, Tokyo (JP); Shigehito Yodo, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 244 days.

(21) Appl. No.: 10/147,283

(22) Filed: May 14, 2002

(65) Prior Publication Data

US 2003/0016909 A1 Jan. 23, 2003

(30) Foreign Application Priority Data

May 15, 2001 (JP) .................................... 2001-145099

(51) Int. Cl.[7] .............................. G02B 6/34; G02B 6/00
(52) U.S. Cl. ...................................... 385/37; 385/13
(58) Field of Search ............................ 385/10, 12, 14, 385/15, 24, 31, 37

(56) References Cited

U.S. PATENT DOCUMENTS

| | | | | |
|---|---|---|---|---|
| 5,042,898 A | * | 8/1991 | Morey et al. | 385/37 |
| 5,367,589 A | * | 11/1994 | MacDonald et al. | 385/37 |
| 5,694,503 A | * | 12/1997 | Fleming et al. | 385/37 |
| 5,841,920 A | * | 11/1998 | Lemaire et al. | 385/37 |
| 6,356,683 B1 | * | 3/2002 | Hu et al. | 385/37 |
| 6,366,721 B1 | * | 4/2002 | Hu et al. | 385/37 |
| 6,449,402 B1 | * | 9/2002 | Bettman et al. | 385/15 |
| 6,510,272 B1 | * | 1/2003 | Wiegand | 385/136 |
| 6,795,615 B2 | * | 9/2004 | Shinozaki et al. | 385/37 |

* cited by examiner

*Primary Examiner*—Joseph Williams
*Assistant Examiner*—Peter Macchiarolo
(74) *Attorney, Agent, or Firm*—Knobbe Martens Olson & Bear LLP

(57) ABSTRACT

An optical module comprises an optical fiber having a formed portion to form a fiber grating and a package to which the optical fiber is secured. The package comprises a single package member or at least two or more package members whose materials differ from each other. The optical fiber is secured to the package member. A distortion for adjusting a Bragg reflection wavelength of the fiber grating of the optical fiber is given to the package member.

10 Claims, 3 Drawing Sheets

OPTICAL MODULE

FIELD OF THE INVENTION

The present invention relates to an optical module used for optical communication.

RELATED ART

A fiber grating is realized as a diffraction grating formed in an optical fiber and causes periodic changes in a reflection index along the longitudinal direction of the fiber. The fiber grating is formed by, for example, radiating ultraviolet light toward an optical fiber so as to create an interference fringe therealong, so that the core of the optical fiber is subjected to changes in the reflection index through light induction.

To form the interference fringe based on the ultraviolet light, a mask (i.e., phase mask) with a grating-forming pattern is used in such a manner that the ultraviolet light is radiated through the mask. This way of forming the grating is known as a phase mask technique. As another way, there is known a holographic technique capable of forming an interference fringe based on ultraviolet light, without using the phase mask.

The fiber grating functions so that it reflects light of a comparatively narrow wavelength bandwidth of which central amount is a Bragg reflection wavelength. The Bragg reflection wavelength is determined based on both the period of the diffraction grating and the effective refraction index of a core. Such fiber grating can be used as a single wavelength filter of an excellent wavelength selective performance.

When the Bragg reflection wavelength of a fiber grating is $\lambda$, the effective refraction index of a core is n, and a grating pitch is $\Lambda$, a relationship of $\lambda=2n\Lambda$ is realized among them. Because both of the effective refraction index n and the grating pitch $\Lambda$ depend on temperature, there has been known that, for example, the Bragg reflection wavelength of a silica-based optical fiber has a temperature dependency of as much as about 0.01 to 0.015 nm/° C.

The above Bragg reflection wavelength has a positive temperature dependency on which the effective refraction index or grating pitch becomes greater with an increase in temperature.

To make compensation for such temperature dependency at the Bragg reflection wavelength, the way of using a temperature-compensating package has been proposed. Specifically, a member of a negative linear expansion coefficient or a member composed of two types of combined materials of which linear expansion coefficients are different from each other is adopted to form a temperature-compensating package for the fiber grating. An optical fiber equipped with the fiber grating is secured on the temperature-compensating package.

The temperature-compensating package thus proposed is able to apply stress to the grating-formed portion of an optical fiber so that the fiber becomes short in length as the temperature rises. However it is still difficult that such stress causes the optical fiber to be compressed.

To overcome this difficulty, the above proposed optical module is designed such that, under a condition that a predetermined amount of set tensile stress applied to the optical fiber at for example an ordinary temperature (e.g., 25° C.), the optical fiber is secured to the temperature-compensating package. Accordingly, when the temperature rises, the tensile stress reduces or becomes zero. Thus, this principle is utilized to manufacture an optical fiber in such a manner that, with the prescribed tensile stress applied to the optical fiber at an ordinary temperature, the optical fiber is secured to the temperature-compensating package.

Such a proposed optical module is able to give a negative temperature dependency to the stress that the temperature-compensating package applies to the fiber grating. That is, drawbacks, such a situation that the pitch of the formed portion of a fiber grating becomes large in length when the temperature rises, can be lessened or avoided. The positive temperature dependency of the refraction index of the optical fiber can therefore be compensated.

In addition, securing an optical fiber equipped with the fiber grating to such temperature-compensating package is achieved by using materials, such as low-melting-pointing glass or metallic solder, or adhesive.

By the way, on account of recent technical advancements in the information-oriented society, it is expected that an amount of pieces of information to be communicated increase at a remarkably rapid speed. It is therefore indispensable that communication through an optical fiber be sufficiently fast and large in capacity. One solution to the fast and large-capacity communication through the optical fiber is a wavelength division multiplexing (WDM), which is at present under study. The wavelength division multiplexing allows a single optical fiber to transmit a plurality of signals whose wavelengths are different from each other at intervals of a prescribed wavelength of 0.8 nm, for example.

A recent study of the wavelength division multiplexing has involved optical parts including an OADM (Optical Add Drop Multiplexer) capable of selectively adding or dropping a plurality of wavelengths of light, such as four waves or twenty waves. This has raised a new demand for optical fibers that enable each of the Bragg reflection wavelengths of their fiber gratings to agree to each of set wavelengths with precision.

However, the Bragg reflection wavelength of a fiber grating depends stress as well as temperature. This dependency has undesirable influences, which results from contraction, expansion and/or heat, on the securing work of an optical fiber to the temperature-compensating package. It is therefore extremely difficult to reduce a difference between a Bragg reflection wavelength and a prescribed wavelength down to amounts of 0.01 nm or less.

SUMMARY OF THE INVENTION

According to one embodiment of the present invention, there is provided an optical module comprising: an optical fiber having a formed portion to form a fiber grating; and a package to which said optical fiber is secured, wherein said package comprises a single package member or at least two package members of which materials differ from each other, said optical fiber is secured to said package member, and a distortion for adjusting a Bragg reflection wavelength of said fiber grating of the optical fiber is given to said package member.

According to other embodiment of the present invention, there is provided a method for adjusting a Bragg reflection wavelength of a fiber grating of an optical fiber, comprising the steps of:

preparing a package comprising a first package member and a second package member of which materials differ from each other and of which linear expansion coefficients differ from each other and having a recess portion to receive therein an optical fiber equipped with a formed portion for the fiber grating;

securing to the recess portion the optical fiber including two positions to be secured and positioned across the formed portion of the fiber grating, one position to be secured of the optical fiber being secured at the first package member and other position to be secured of the optical fiber being secured at the second package member; and giving a distortion for adjusting a Bragg reflection wavelength of the fiber grating of the optical fiber, to at least one of the first and second package members, after securing the optical fiber to the first and second package members.

DETAILED DESCRIPTION OF PREFERRED EMBODIMENTS

Referring to the accompanying drawings, various preferred embodiments of the present invention will now be described. The present invention has been made to solve the foregoing problem, and an object of the present invention is to provide an optical module capable of adjusting the Bragg reflection wavelength of a fiber grating with precision, but without any limitations.

Figure 1A:
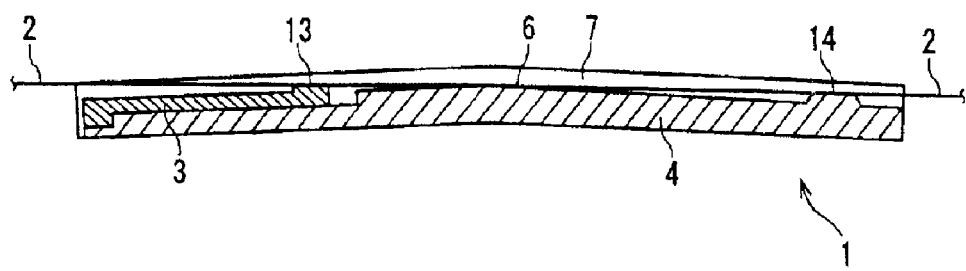
FIGS. 1A to 1C are essential-part schematic views each showing a first embodiment of an optical fiber according to the present invention.
Figure 1B:
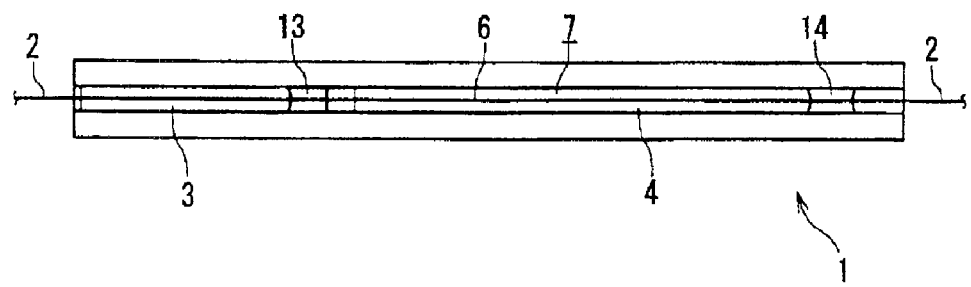
Figure 1C:
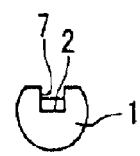

FIGS. 1A to 1C show schematic views each showing an essential part of a first embodiment of an optical module according to the present invention, FIG. 1A shows a section of the optical module, FIG. 1B shows the plan view of the optical module, and FIG. 1C shows the frontal view of the optical module viewed from the left side in FIG. 1B.

As shown therein, the optical module according to the present embodiment has an optical fiber 2 in which a fiber grating is formed and a package 1 to which the optical fiber 2 is secured. The optical fiber 2 includes a core and a clad covering the outer circumferential surface of the core. A difference in a specific refraction index of the core to that of the clad is set to be at least 0.35%.

As shown in FIGS. 1A and 1B, the package 1 comprises a first package member 3 and a second package member 4. The first and second package members 3 and 4 are made of materials that are different from each other in both kinds and thermal linear expansion coefficients.

The first package member 3 is made of aluminum whose linear expansion coefficient is $2.27 \times 10^{-5}/°$ C., while the second package member 4 is made of Invar material (INVAR (36FN)) whose linear expansion coefficient is $1.6 \times 10^{-6}/°$ C. That is, the first package member 3 is larger in the linear expansion coefficient that the optical fiber 2, and the second package member 4 is largely smaller in the linear expansion coefficient them both the optical fiber 2 and the first package member 3.

Further, as shown in FIG. 1C, both of the frontal configuration and a configuration sectioned perpendicularly to the longitudinal direction of the optical fiber 2 are shaped into approximately semicircles. A groove 7, of which perpendicularly crossed section is shaped into an approximately rectangular recess and located in the central part of any section of the package 1, is formed along the entire package 1. The optical fiber 2 is placed in the groove 7. As shown in FIGS. 1A and 1B, on the bottom of the groove 7, securing portions 13 and 14 are rigidly formed with a predetermined interval in the longitudinal direction of the optical fiber 2.

The optical fiber 2 is secured to the package 1 such that both positions to be secured of the optical fiber 2, which are located to be across and along a formed portion 6 of the fiber grating, are secured on the first and second package members 3 and 4. Specifically, one position to be secured of the optical fiber 2 is secured to the securing portion 13 integrally formed on the first package member 3, while the other position to be secured of the optical fiber 2 is secured to the securing portion 14 integrally formed on the second package member 4. An appropriate securing material, such as low-melting-point glass, metallic solder, or adhesive, is used to secure the positions of the optical fiber 2 on the securing portions 13 and 14.

Figure 2A:
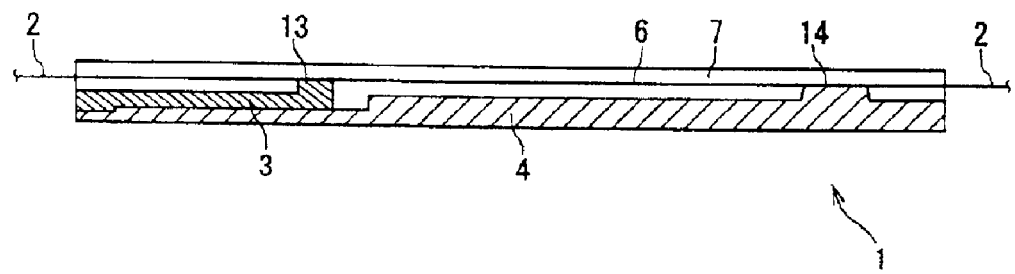
FIGS. 2A and 2B are illustrations each showing, using a cross sectional view, the manufacturing method of the optical module according to the first embodiment.

In performing such securing, the optical fiber 2 is placed on a tension-applying jig. Then, like the securing way of the optical fiber to the temperature-compensating package, which is taught by the conventionally proposed technique, the optical fiber 2 is secured to the first and second package members 3 and 4. That is, with a prescribed tensile tension given to the optical fiber 2 at an ordinary temperature, the optical fiber 2 is secured on the first and second package members 3 and 4 so that the Bragg reflection wavelength of the fiber grating becomes equal to a prescribed wavelength. FIG. 2A showing a securing structure for the optical fiber 2, which can be seen during the securing work.

Figure 2B:
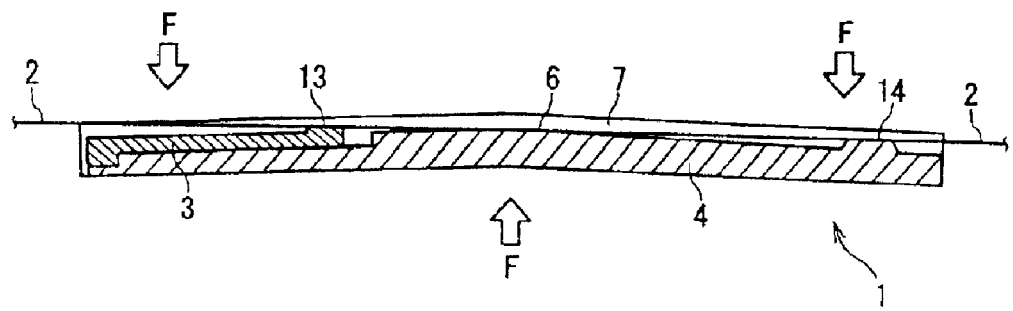

After securing the optical fiber 2 to the first and second package members 3 and 4, as stated above, a stress F is applied, as shown in FIG. 2B, to the second package member 4 so that it is subject to a plastic deformation. This permits the second package member 4 to have a distortion to adjust the Bragg reflection wavelength of the fiber grating of the optical fiber 2, thus providing the structure shown in FIG. 1A.

In the optical module according to the first embodiment, the distortion is given to the second package member 4 so that the Bragg reflection wavelength of the fiber grating of the optical fiber 2 is made to be approximately equal to the prescribed wavelength. In this setting, a difference (i.e., error) between the Bragg reflection wavelength and the prescribed wavelength is adjusted such that it falls within a range of 0.01 nm or less.

Figure 3:
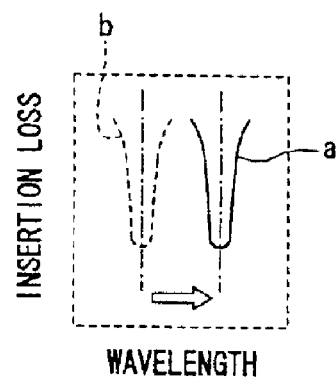
FIG. 3 represents the effect of adjusting the Bragg reflection wavelength of the optical fiber employed in the first embodiment.

In the first embodiment, the second package member 4 undergoes the plastic deformation to protrude the package member 4 upward. This deformation causes the tensile stress applied to the optical fiber 2 to be larger than the foregoing tensile stress. Thus, the Bragg reflection wavelength of the fiber grating is shifted to its longer wavelength side, as illustrated in FIG. 3. As shown therein, an optical spectrum shown by a curve b is shifted to a further optical spectrum shown by a curve a so that the Bragg reflection wavelength is made to almost agree to the prescribed wavelength.

For the sake of an ester understanding an amount of deformation given to the second package member 4, FIGS. 1A and 2B are depicted in an exaggerated manner. An actual amount of deformation of the second package element 4 is, however, no more than a few micrometers, even when a shifted amount of the Bragg reflection wavelength is 0.2 nm. In other words, an amount of deformation can be set to be less than an error arising in machining the second package member 4.

Figure 4:
FIG. 4 shows an illustration of a measuring system to measure the Bragg reflection wavelength of the optical fiber employed in the first embodiment.

FIG. 4 shows a system for measuring the Bragg reflection wavelength of the fiber grating of the optical module according to the present embodiment. Specifically, as illustrated therein, a light source 30 is connected to one end of the optical fiber 2 included in the optical module, while an optical spectrum analyzer 31 is connected with the other end of the optical fiber 2. This enables the measurement of the Bragg reflection wavelength of the fiber grating formed in the optical fiber 2.

In the present embodiment, as described above, the optical fiber 2 is secured on the first and second package members 3 and 4, before a distortion is given to the package member 4 so that the Bragg reflection wavelength of the fiber grating of the optical fiber 2 is approximately equal to a prescribed wavelength. Hence, even if the Bragg reflection wavelength is shifted from the prescribed wavelength owing to various reasons including irregularities in the contraction of the securing material to secure the optical fiber 2 to the first and second packages 3 and 4, an amount of the shift can be compensated by the distortion given to the second package member 4. This way makes it possible to make the Bragg reflection wavelength agree to the prescribed wavelength with precision.

The foregoing distortion is given to the second package member 4 through a plastic deformation thereof. As a result, the foregoing shift can be adjusted in a remarkably easier fashion, the optical module can also be manufactured easily, and a yielding percentage for the optical module can be improved.

Moreover, in the present embodiment, both of the positions to be secured of the optical fiber 2, which are located across the formed portion 6 of the fiber grating, are secured on the first and second package members 3 and 4, respectively. The one position to be secured is then secured on the first package member 3 larger in the thermal linear expansion coefficient than the optical fiber 2, while the other position to be secured is secured on the second package member 4 less in the thermal linear expansion coefficient than the optical fiber 2. It is therefore possible that the package 1 applies a distortion to the optical fiber 2 in an opposing direction to a force generated to make the optical fiber 2 expand in the longitudinal direction thereof. This will lessen inconveniences such as enlargement of the fiber grating pitch.

Accordingly, the optical module according to the present embodiment has the capability of reducing the temperature dependency of the Bragg reflection wavelength of the fiber grating.

In addition, the present embodiment not only employs the second package member 4 made of Invar material of which thermal linear expansion coefficient is very small but also gives the second package member 4 a plastic deformation that allows the Bragg reflection wavelength of the fiber grating to be equal to the prescribed wavelength. Therefore, an effect for suppressing the temperature dependency of the Bragg reflection wavelength can be provided as high level as a package member with no plastic deformation.

The present embodiment adopts both of the first package member 3 made of aluminum and the second package member 4 made of Invar material. These materials are easily available and easier to work, so that the package 1 can be manufactured more easily at a lower cost. The optical module can also be manufactured with ease at a lower cost.

Further, in the present embodiment, a difference in the specific refraction rate of the core of the optical fiber 2 to that of the clad thereof is determined to be a value larger than that of a single-mode optical fiber. This determination makes it possible to reduce an amount of adjusting distortion to be given to the second embodiment 4. The manufacture of the optical module can therefore be facilitated more, and the package is able to effectively provide the effect of compensating the temperature dependency of the Bragg reflection wavelength of the fiber grating formed in the optical fiber.

Figure 5:
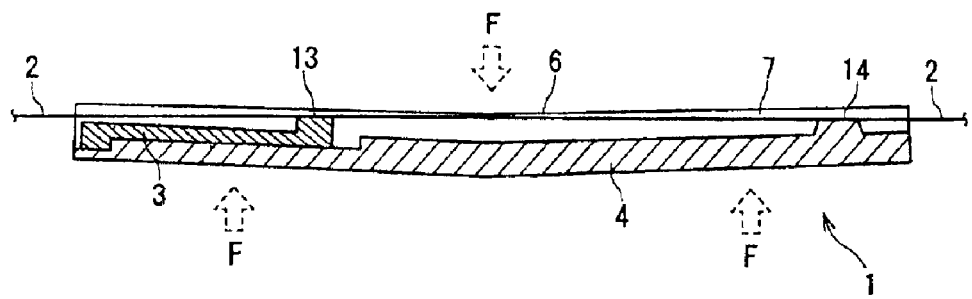
FIG. 5 is an essential-part schematic view showing a second embodiment of an optical module according to the present invention.

Referring to FIG. 5, a second embodiment of the present will now be described. FIG. 5 is a pictorially shown cross section of an optical module according to the second embodiment. This optical fiber is composed in general in the similar manner to that in the first embodiment except one characteristic. Such characteristic inherent to the second embodiment is that the second package member 4 is subjected to a plastic deformation in a different direction from that in the first embodiment.

Specifically, in the first embodiment, the plastic deformation has been given to the second package member 4 so that it forms an upward convex. In contrast, a downward convex is given to the second package member 4 in the second embodiment. This downward deformation will cause a tensile tension applied to the optical fiber 2 to be adjusted to be less than the foregoing set tensile stress.

Figure 6:
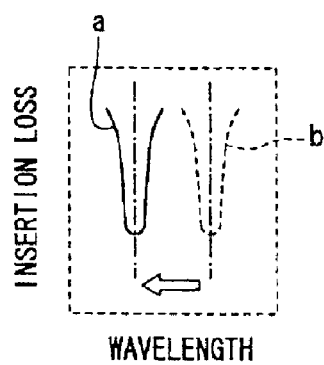
FIG. 6 represents the effect of adjusting the Bragg reflection wavelength of the optical fiber employed in the second embodiment.

By this adjustment, as shown in FIG. 6, the Bragg reflection wavelength of the fiber grating formed in the optical fiber 2 can be shifted to a shorter-wavelength side (that is, from the optical spectrum shown by a curve b to that shown by a curve a in FIG. 6).

In FIG. 5, arrows F show directions along which stress is applied to give the second package member 4 a plastic deformation. Like FIGS. 1 and 2, FIG. 5 is also depicted so as to exaggerate positional changes of the second package member 4.

The second embodiment, which is configured as above, results in that the similar advantages obtained in the first embodiment can be obtained in this second embodiment as well.

In addition, the present embodiment will not be limited by the configurations shown by the foregoing embodiments, but a variety of modifications can be added to the foregoing embodiments. For instance, although the foregoing embodiments have used the first package member 3 made of aluminum and the second package member 4 made of Invar material, the materials to be used as the first and second package members 3 and 4 are not confined to those listed materials. Any appropriately selected materials are available to the package members 3 and 4.

Another modification is concerned with the plastic deformation of the second package member 4. In the case of the foregoing embodiments, the plastic deformation has been given to the second package member 4. Alternatively, such deformation may be given to both of the first and second package members 3 and 4. Moreover, only the first package member 3 can experience such a plastic deformation. In order to make the package 1 efficiently provide the effect of compensating the temperature dependency of the Bragg reflection wavelength of the fiber grating formed in the optical fiber 2, it is preferred that the plastic deformation be caused in only the second package member 4 of which linear expansion coefficient is smaller. This is an alternative way of giving the distortion for adjusting the Bragg reflection wavelength.

Still, another modification is provided as other ways of giving the distortion. In the foregoing embodiments, the second package member 4 has been plastic-deformed to give a distortion to adjust the Bragg wavelength of the fiber grating of an optical fiber. Besides this way, a laser, such as a YAG laser, can be used to give the distortion to at least one of the first and second package members. Additionally, a package member may be marked with injuries to provide the package member with a distortion. The above listed ways also enable adjustment of the Bragg reflection wavelength of a fiber grating.

Another modification concerns the specific refractive indices of the core and clad of the optical fiber 2. Though a difference in the specific refractive index of the core to that of the clad has been set to be larger than the difference given to in a single-mode optical fiber explained in the foregoing embodiments, such setting is listed as just one example. Such difference in the specific refractive indices should not be restricted by any particular amount, but an appropriately selected amount may be adopted.

Still another modification is provided as the package 1 with various modified configurations. In the foregoing embodiments, the package 1 has been configured with two package members (i.e., the first and second package members 3 and 4) whose materials differ from each other. The package 1, however, may be formed with three or more package materials. In addition, the package 1 may be formed with a material having a negative linear expansion coefficient. In such cases, the optical fiber 2 is secured to the package 1, and then, like the foregoing embodiments, a distortion is given to the package member. These working steps also enable adjustment of the Bragg reflection wavelength of the fiber grating of the optical fiber 2.

According to the present invention, one position to be secured of an optical fiber in which a fiber grating is formed is secured at a first package member, while the other position to be secured of the optical fiber is secured at a second package member different in a linear expansion coefficient from the first package member. After this securing work, a distortion for adjusting the Bragg reflection wavelength of the fiber grating is given to at least one of the first and second package members. Therefore, the distortion given after the securing work enables the Bragg reflection wavelength of the fiber grating to be adjusted arbitrarily, thus improving a yielding percentage for the optical fiber when it is manufactured.

In particular, the present invention provides an optical module that gives a distortion to at least one of the first and second package members so that the Bragg reflection wavelength of the fiber grating of an optical fiber is made to be approximately equal to a prescribed wavelength. Because the Bragg reflection wavelength and the prescribed wavelength are approximately equal to each other, this optical module is available to optical parts. This availability provides optical parts that have a multiple-wavelength reflective filtering function to selectively reflect light of a plurality of wavelengths, such as four waves or twenty waves, from wavelength-multiplexed light to be transmitted.

Further, in the present invention, only either one of the first or second package member is allowed to have the distortion and one package member to which the distortion is given is smaller in the thermal linear expansion coefficient than the remaining package member. This configuration makes the package provide, with efficiency, the compensating effect of the temperature dependency concerning the Bragg reflection wavelength of the fiber grating of an optical fiber.

In the present invention, the first package member is made of aluminum, while the second package member is made of Invar material. By providing the second package member with the distortion, a lower-cost optical module can be manufactured with ease.

The present invention also provides the configuration in which the distortion is given to a package member by plastic-deforming the package member itself. This way makes it possible that the distortion for adjusting the Bragg reflection wavelength of a fiber grating is given with ease and precision. This precise distortion enables an easier and precise adjustment of the Bragg reflection wavelength.

Still further, the present invention is directed to an optical fiber that has a core and a clad covering the outer circumferential surface of the core, in which a difference in the specific refraction index of the core to that of the clad is determined to be 0.35% or more. This configuration reduces an amount of adjustment distortion to be given to a package member, so that the optical module can be manufactured more easily. At the same time, the package is able to effectively provide the compensating effect of the temperature dependency concerning the Bragg reflection wavelength of the fiber grating of an optical fiber.

What is claimed is:

1. An optical module comprising: an optical fiber having a formed portion to form a fiber grating; and a package to which said optical fiber is secured, wherein said package comprises a single package member or at least two package members of which materials differ from each other, said optical fiber is secured to said package member, and a distortion for adjusting a Bragg reflection wavelength of said fiber grating of the optical fiber is given to said package member, wherein said package comprises a first package member and a second package member which is different in linear expansion coefficient differs from the first packaged member, the optical fiber including two positions to be secured which are located across from the formed portion of the fiber grating, one position to be secured of the optical fiber being secured to the first package member and the other position to be secured of the optical fiber being secured to the second package member, and the distortion being given to at least one of the first and second package members after securing the optical fiber to the first and second package members, wherein the distortion is given to at least one of the first and second package members, thereby the Bragg reflection wavelength of the fiber grating of the optical fiber being approximately equal to a prescribed wavelength, and wherein the distortion is given to only one package member selected from the first and second package members and the distortion-given package member is smaller in the linear expansion coefficient from a remaining package member.

2. The optical module of claim 1, wherein the first package member is made of aluminum and the second package member is made of Invar material, the distortion being given to the second package member.

3. The optical module of claim 2, wherein the distortion is given to the second package member by applying plastic deformation to the second package member.

4. The optical module of claim 3, wherein the plastic deformation is performed toward the optical fiber in a direction perpendicular to an axial line of the second package member.

5. The optical module of claim 3, wherein the plastic deformation is performed away from the optical fiber in a direction perpendicular to an axial line of the second package member.

6. The optical module of claim 2, wherein the distortion is given to the second package member using a laser device including a YAG laser.

7. The optical module of claim 2, wherein the distortion is given to the second package member by marking the second package means.

8. A method for adjusting a Bragg reflection wavelength of a fiber grating of an optical fiber, comprising:

preparing a package comprising a first package member and a second package member of which materials differ from each other and of which linear expansion coefficients differ from each other and having a recess portion to receive therein an optical fiber equipped with a formed portion for the fiber grating;

securing to the recess portion the optical fiber including two positions to be secured and positioned across the formed portion of the fiber grating, one position to be secured of the optical fiber being secured at the first package member and other position to be secured of the optical fiber being secured at the second package member; and giving a distortion for adjusting a Bragg reflection wavelength of the fiber grating of the optical fiber, to at least one of the first and second package members, after securing the optical fiber to the first and second package members, wherein the distortion is given to only one package member selected from the first and second package members and the distortion-given package member is smaller in the linear expansion coefficient from a remaining package member.

9. The method of claim 8, wherein the distortion is given to the package member by applying plastic deformation to the package member.

10. The method of claim 9, wherein a tensile stress applied to the optical fiber by plastic-deforming the one package member is adjusted to be larger than a prescribed tensile stress so that the Bragg reflection wavelength of the fiber grating is shifted to a longer wavelength side to make the wavelength reflection wavelength equal approximately to a prescribed wavelength.

* * * * *

UNITED STATES PATENT AND TRADEMARK OFFICE
CERTIFICATE OF CORRECTION

PATENT NO. : 6,947,636 B2  Page 1 of 1
DATED : September 20, 2005
INVENTOR(S) : Shinozaki et al.

It is certified that error appears in the above-identified patent and that said Letters Patent is hereby corrected as shown below:

Column 3,
Line 16, delete "fiber" and insert -- module --.
Line 46, after "invention" delete "," and insert -- . --.

Column 4,
Line 1, delete "that" and insert -- than --.
Line 3, delete "them" and insert -- than --.
Line 40, delete "showing" and insert -- shows --.
Line 59, after "protrude the" insert -- second --.

Column 5,
Line 1, delete "ester" and insert -- easier --.
Line 21, after "to the" insert -- second --.

Column 8,
Line 43, delete "pack-aged" and insert -- package --.

Column 10,
Line 24, after "the" delete "wavelength" and insert -- Bragg --.

Signed and Sealed this

Second Day of May, 2006

JON W. DUDAS
*Director of the United States Patent and Trademark Office*